3,230,238
PROCESS FOR THE PREPARATION OF ALKENYL AND FURFURYL TRIFLUOROACETATES

Robert S. Yost, Huntsville, and Royland D. Shoults, Arab, Ala., assignors, by mesne assignments, to the United States of America as represented by the Secretary of the Army
No Drawing. Filed Sept. 15, 1961, Ser. No. 138,303
5 Claims. (Cl. 260—347.4)

This invention concerns an improved process for the preparation of alkenyl trifluoroacetates. More specifically, it concerns a process for producing alkenyl trifluoroacetates which comprises reacting trifluoroacetic anhydride plus an alkenol plus a tertiary amine.

The homopolymers of alkenyl trifluoroacetates are in general low molecular weight liquid products. Copolymerization with other vinyl monomers, particularly in the range of 4 to 95 percent of the vinyl monomer, leads to solid polymers. The properties of the various copolymers are dependent upon the type of monomer and the amount of it present in the polymers. Products ranging from soft rubbery materials to high softening rigid polymers can be obtained. Thus, molding, and fiber and film-forming materials of considerable value are provided.

The prior art, particularly as set forth in U.S. Patent No. 2,759,912, shows the reaction of trifluoroacetic acid plus allyl alcohol and states, but gives no example of, that "the new monomers (allyl and methallyl esters of trifluoroacetic acid) are readily prepared by reacting trifluoroacetic anhydride with an allyl alcohol."

Trifluoroacetic acid, water and the corresponding alcohol of the ester impair the purity of the alkenyl esters of trifluoroacetic acid boiling in the vicinity of trifluoroacetic acid, in that water hydrolyses the esters. The improved method of the present invention is unique in that water is not formed in the reaction, all the alcohol is reacted, and the acid is fixed as a salt by a tertiary amine.

The procedure involves two reactions, the reaction of an alkenyl alcohol with trifluoroacetic anhydride and the reaction of trifluoroacetic acid with a tertiary amine.

When employing trifluoroacetic acid and the alcohol, prior art processes have shown the use of benzene or a comparable aromatic hydrocarbon such as an azeotroping agent for the water which was produced, thus driving the reaction substantially to completion. However, it has been found difficult to remove the benzene or other hydrocarbon completely so that the alkenyl trifluoroacetate produced contains at least traces of these hydrocarbons. Depending upon the use for which the trifluoroacetate is intended, the presence of these hydrocarbons can be very objectionable.

The order of addition is not important, but preferably an amount of the tertiary amine equivalent to the anhydride is present in the reaction mixture. It is possible to add the alkenol to the trifluoroacetic anhydride followed by the addition of the tertiary amine, but the preferred method involves the addition of the anhydride to a mixture of the alkenol and the tertiary amine.

Whereas the reaction can be conducted employing a molar ratio of alkenol to trifluoroacetic anhydride to tertiary amine of 1:1:1, it is preferred that there be an excess of the anhydride and the amine. The molar ratios of amine to trifluoroacetic anhydride should always be equivalent, and the preferred embodiment prefers a molar ratio of alkenol to trifluoroacetic anhydride to tertiary amine of from 1 to 1.1 to 1.1 to 1 to 1.5 to 1.5.

The reaction between the anhydride and the alkenol and the amine is exothermic and the temperature can be controlled by the rate of addition of the anhydride to the alkenol-amine mixture and/or by external cooling. During the addition, the temperature is maintained in the range of 10° C. to 100° C. preferably 30° C. to 40° C. and when the addition is complete, the temperature is maintained in the range of 25° C. to 30° C. for 0.5 to 2 hours.

It has been found that a large number of alkenols can be esterified by this process and there is no limit to the molecular weight of the alkenols which can be employed. Typical of such alcohols are: allyl alcohol, methallyl alcohol, 5-hexen-1-ol, crotyl alcohol, 1-penten-3-ol, 3-penten-2-ol, divinylcarbinol, furfuryl alcohol, 2-buten-1-ol and the like.

An outstanding advantage of the present process is that it produces alkenyl trifluoroacetic esters in high yield and with a high degree of purity.

All tertiary amines will function satisfactorily since the purpose of the amine is to form the amine salt of the trifluoroacetic acid which is liberated when the trifluoroacetic anhydride reacts with the alkenol. Typical of such tertiary amines are: triethylamine, N,N-dimethylaniline, pyridine, tribenzylamine, tri-n-propylamine, tri-n-butylamine, N,N-dimethylbenzylamine, tri-iso-amylamine, tri-n-amylamine, tri-n-heptylamine, tri-n-hexylamine, trioctylamine, and the like.

In reactions where the amine salt of trifluoroacetic acid is not separated from the ester by filtration or decantation, it is preferred that the reaction mixture, when the reaction is completed, be distilled under reduced pressure to separate the product from the amine salt of trifluoroacetic acid, thus preventing decomposition of the salt.

EXAMPLE I

To a 250 ml. 3-necked-flask fitted with a magnetic stirrer, thermometer, chilled water reflux condenser, and small dropping funnel was added 29 grams (0.5 mole) of allyl alcohol and 55.5 grams (0.5 mole+10% excess) of triethylamine. The dropping funnel was charged with 115.5 grams (0.5 mole+10% excess) of trifluoroacetic anhydride and this was slowly added dropwise to the alcohol-amine solution. The pot temperature was maintained between 30 and 40° C. with an ice-water bath and by varying the addition rate of the anhydride. When the addition was completed (20–25 minutes) the ice-bath was removed, boiling chips were added, and the temperature was allowed to come to 25° C. after the reaction was completed. The acid-amine vapors that were formed during the reaction were removed by introducing a vacuum hose into the flask.

The pot was transferred to a 45 cm. glass helices-packed column where the allyl trifluoroacetate was distilled at 200 mm. of mercury. Essentially all the product was distilled when the pot temperature reached 100° C. B.P. 44–45° C./200 mm., 79–80° C./atmos. $n_D^{20}$=1.3352. $d_4^{25}$=1.168. Saponification equiv.=154.5 (theory, 154.1).

Elemental analysis.—Calculated: C, 38.97; H, 3.27; F, 36.99. Found: C, 38.38; H, 3.53; F, 35.70.

EXAMPLE II

*Methallyl trifluoroacetate*

Methallyl trifluoroacetate was prepared in essentially the same way as allyl trifluoroacetate in 60% yield. B.P. 54–53° C./200 mm. $n_D^{20}$=1.3510. $d^{25°\ C.}$=1.119. B.P. 96–97° C./atmos.

EXAMPLE III

Alkenyl trifluoroacetates with higher boiling points were prepared by reacting the unsaturated alcohol with trifluoroacetic anhydride in the presence of pyridine with anhydrous ether as a solvent. The following reaction will serve as an example of the experimental technique employed.

*5-hexen-1-yl trifluoroacetate.*—To a mixture of 20.0 grams (0.2 mole) of 5-hexen-1-ol and 16.59 grams (0.21 mole) of pyridine dissolved in 150 ml. of anhydrous ether in a 300 ml. three-necked flask fitted with magnetic stirrer, condenser, thermometer and dropping funnel (all outlets fitted with Drierite drying tubes) was added slowly 46.2 grams (0.21 mole) of trifluoroacetic anhydride over a period of one hour while cooling the flask externally with an ice-water bath. The reaction was continued for two hours after the addition was complete. The solid precipitate which appeared during the early stages of the reaction was removed by filtration, the solid washed with two 50 ml. portions of ether and the ether washings added to the original filtrate. The ether was removed by evaporation and the residue distilled to give 21.33 grams of a distillate, B.P. 74–76° C. (76 mm.); $n_D^{20}$ 1.3791. The product was identified by its infrared spectrum (C=O, 5.84μ; CF, 8.65μ, C=C, 3.2μ, 6.08μ, 7.55μ) and purity (approximately 98%) was obtained by gas chromatography studies.

EXAMPLE IV

The following esters were prepared in a similar manner and characterized by their infrared spectra and gas chromatography.

We claim:
1. A process for the preparation of alkenyl trifluoroacetates and tertiary amine salts of trifluoroacetic acid which comprises reacting an alkenol, trifluoroacetic anhydride and a tertiary amine, said tertiary amine being present in a quantity molarly equivalent to the trifluoroacetic anhydride at a temperature of from 10° C. to 100° C., and recovering said alkenyl trifluoroacetates.
2. A process as set forth in claim 1 in which the molar ratio of alkenol to trifluoroacetic anhydride to tertiary amine is from 1:1:1 to 1:1.5:1.5.
3. A process as set forth in claim 1 in which the reaction temperature is from 30° C. to 40° C.
4. A process as set forth in claim 1 in which the tertiary amine is selected from the group consisting of triethylamine, N,N-dimethylaniline and pyridine.
5. A process as set forth in claim 1 in which the alkenol is selected from the group consisting of allyl alcohol, methallyl alcohol, divinyl carbinyl, furfuryl alcohol, crotonyl alcohol, 1-penten-3-yl alcohol, and 3-penten-2-yl alcohol.

| Trifluoroacetate | Structure | B.P. (° C.) | $n_D^{20}$ | Percent yield |
|---|---|---|---|---|
| Methallyl trifluroacetate | $CF_3C(=O)-OCH_2C(CH_3)=CH_2$ | 42 (72 mm.) | 1.3516 | 68 |
| Crotonyl trifluoroacetate | $CF_3C(=O)-OCH_2CH=CHCH_3$ | 44 (78 mm.) | 1.3568 | 48 |
| 1-penten-3-yl trifluoroacetate | $CF_3C(=O)-O-CH(CH_2CH_3)CH=CH_2$ | 40–42 (58 mm.) | 1.3561 | 39 |
| 3-penten-2-yl trifluoroacetate | $CF_3C(=O)-O-CH(CH_3)-CH=CH-CH_3$ | 46–49 (56 mm.) | 1.3592 | 51 |
| Divinylcarbinyl trifluoroacetate | $CF_3C(=O)-OCH(CH=CH_2)_2$ | 41–42 (62 mm.) | 1.3676 | 62 |
| Furfuryl trifluoroacetate | $CF_3C(=O)-O-CH_2-\text{(furyl)}$ | 40 (5 mm.) | 1.3661 | 65 |

References Cited by the Examiner

UNITED STATES PATENTS 2,759,912  8/1956  Coover et al. _____ 260—347.4

OTHER REFERENCES

Hickinbottom: Reactions of Organic Compounds (second edition, 1948), page 98.

HENRY R. JILES, *Acting Primary Examiner.*

IRVING MARCUS, L. D. ROSDOL, CARL D. QUARFORTH, *Examiners.*

L. A. SEBASTION, *Assistant Examiner.*